United States Patent [19]
Pynenburg et al.

[11] Patent Number: 6,129,969
[45] Date of Patent: Oct. 10, 2000

[54] FOAM SIGN

[75] Inventors: Adrian W. Pynenburg; Gary S. Pasternak; Martin S. Cross, all of Brantford, Canada

[73] Assignee: Storeimage Programs Inc., Brantford, Canada

[21] Appl. No.: 09/370,520

[22] Filed: Aug. 6, 1999

[51] Int. Cl.[7] ...................................................... B32B 3/10
[52] U.S. Cl. .................................. 428/67; 40/596; 40/615
[58] Field of Search .................................. 428/67, 318.4, 428/304.4; 40/596, 615

[56] References Cited

U.S. PATENT DOCUMENTS 2,988,835  6/1961  Murphy ........................................ 40/135

*Primary Examiner*—Alexander S. Thomas
*Attorney, Agent, or Firm*—Howard J. Greenwald

[57] ABSTRACT

A foam sign made from a laminated substrate and several cuts outs die cut from the substrate. The laminated substrate contains a foam layer with a thickness of from about 0.5 to about 3.0 inches, wherein the foam has a density of from about 1.2 to about 2.0 pounds per square foot; the substrate also contains a plastic sheet adhesively joined to the foam layer, wherein the plastic sheet has a thickness of from about 0.007 to about 0.03 inches; and the laminated substrate also has several cavities designed to receive the cut outs. The cut outs are disposed within such cavities such that the top surfaces of the cut outs are either above or below the top surfaces of the laminated substrate.

16 Claims, 7 Drawing Sheets

FOAM SIGN

FIELD OF THE INVENTION

A sign with a laminated foam backing and a multiplicity of laminated cut outs disposed within such backing.

BACKGROUND OF THE INVENTION

U.S. Pat. No. 2,988,835 of Francis S. Murphy discloses a process for producing a lightweight flat character for a display sign. In the process described in this patent, a laminated panel material 10 comprising a styrene type plastic foam core 16 which is heat sealed to sheets of kraft paper 17 is die cut. The laminated character thus produced is taught to be useful for display signs. However, if one were to attempt to make a sign from the laminated character by pushing it partially or completely into the foam core from which it was cut, the kraft paper wrinkles and thus presents a poor image.

The Murphy patent does not specify the thickness of its laminated panel material 10, merely stating that it is ". . . of uniform thickness . . . . " However, it is apparent to those skilled in the art from the disclosure of the Murphy patent and its drawings that such laminated panel material 10 has a thickness of from about 0.06 to about 2 inches. A laminated character cut from such a panel material does not present a sufficiently definite three-dimensional appearance.

The foam characters produced by the process of the Murphy patent could not be used to produce signs with attractive three-dimensional effects. For many years, such signs have been produced by using "gatorboard," which is a styrene foam sheet laminated with white, tan, or black kraft process cellulose paper and which is manufactured by the International Paper Company of 6400 Poplar Avenue, Memphis, Tenn. This "gatorboard" is rather expensive, generally costing about 120 dollars for a 1.5 inch thick 4'×8' sheet.

When characters are cut out of such "gatorboard," and then reinserted into the area from which they have been cut, there generally is a gap of at least about 0.12 inches between the characters and the base material. Thus, these characters cannot be friction fit within the recesses produced in the base material. To produce a sign from such "gatorboard" in which the characters can be friction fit, one must separately machine recesses within another piece of "gatorboard" which will match the dimensions of the characters machined from the first piece of "gatorboard." This is a prohibitively expensive process.

One may use a laminated foam panel instead of the "gatorboard" to attempt to produce such three-dimensional signage with friction fit characters. However, when the characters are die cut by conventional means from such panel, a substantial amount of the material is fractured and thus presents a poor appearance as well as poor structural integrity.

It is an object of this invention to provide a sign structure which presents an attractive three-dimensional affect and which has a multiplicity of laminated characters attached to and disposed within a laminated base.

It is another object of this invention to provide a sign structure which affords a cost effective means for providing a wide range of graphic effects on various surfaces.

It is yet another object of this invention to provide a lightweight, substantially damage-resistant sign structure.

SUMMARY OF THE INVENTION

In accordance with this invention, there is provided a foam sign comprised of a laminated substrate and a multiplicity of laminated indicia attached to and disposed within such laminated substrate. The laminated substrate is comprised of a foam core with a thickness of from about 0.5 to about 3.0 inches and a density of from about 1.2 to about 2 pounds per cubic foot adhesively attached to a sheet of plastic with a thickness of from about 0.007 to about 0.03 inches; and the indicia cut from such laminated substrate are friction fit and partially disposed within the substrate. There is substantially no gap between the substrate and the indicia disposed within the substrate.

BRIEF DESCRIPTION OF THE DRAWINGS

The invention will be described by reference to the following drawings, in which like numerals refer to like elements, and in which.

Description of the preferred embodiments

Figure 1:
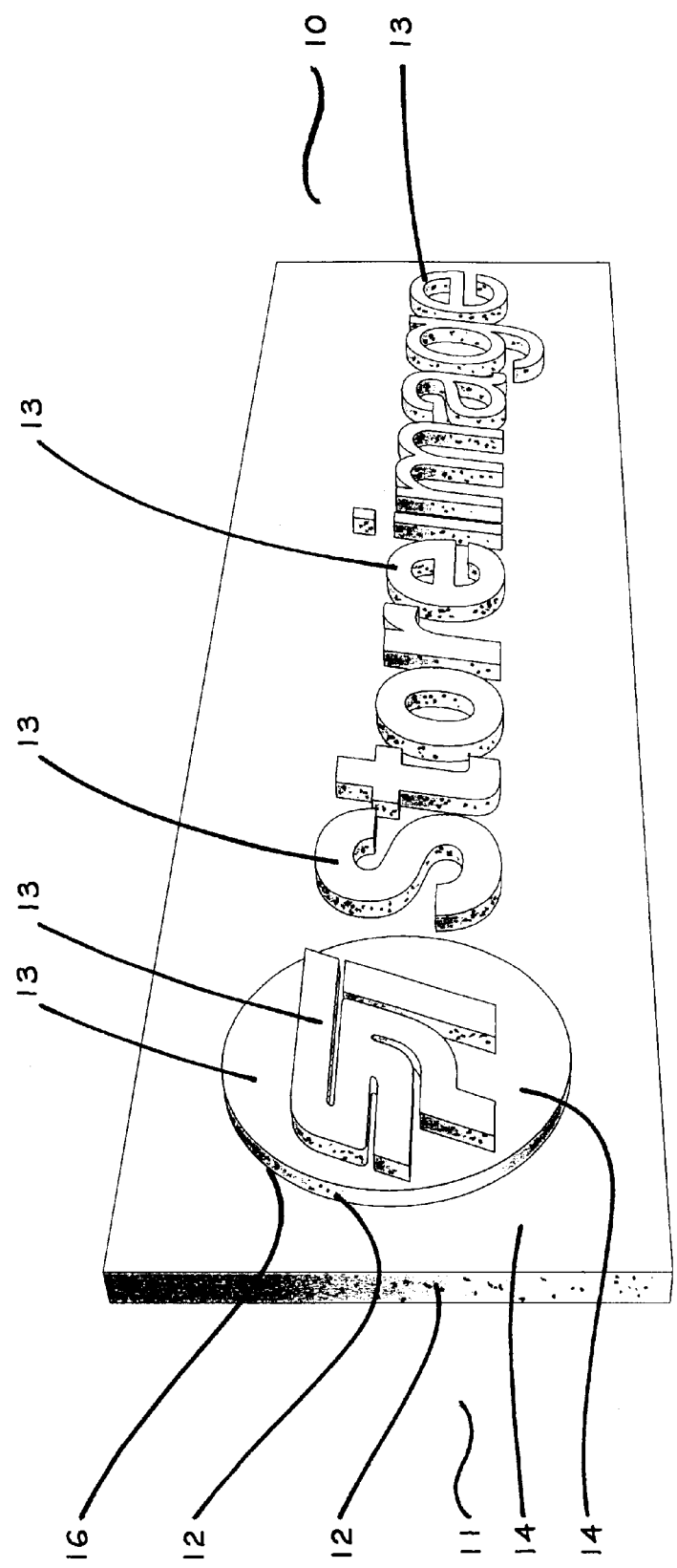
FIG. 1 is a perspective view of one preferred embodiment of the invention.

FIG. 1 is a perspective view of a foam sign system 10 that is comprised of a base 11 comprising a foam substrate material 12, a plastic sheet 14 adhesively attached to the foam substrate material 12, and a multiplicity of cut outs 13, each of which is also comprised of a foam substrate material 12 and a plastic sheet 14 adhesively attached to the foam substrate material 12. In one embodiment, foam sign system 10 has a length up to about 6 feet and a width up to about 5 feet.

The cut outs 13 may be in the shape of letters, figures, words, printed designs, trademarks, numerals, regular shapes, irregular shapes, and the like. Inasmuch as cut outs 13 are produced from base 11, base 11 is comprised of a series of cavities 15 which are identical in shape to the cut outs 13.

FIG. 1 illustrates the structure 10 which is provided when the cut outs 13 are force fitted into the cavities 15. It is noteworthy that, at the interface 16 of the cut out 13 and the base 11, there is no gap; the cut out 13 fits snugly into the cavity 15 so that a light shining on one side of the system 10 will not be seen on the other side. If a pin with a diameter of 0.13 inches is inserted at interface 16 and through said interface to the back of base 11, it will have to compress either base 11 and/or cut out 13 in order to fully extend to the back side of base 11.

The snug friction fit between the cut outs 13 and the base 11 also guarantees that the cutout will be retained within the base without any need for adhesive joining. Inasmuch as the base 11 and the cutouts 13 both are the same material, there is a physical and chemical likeness between them.

Figure 2:
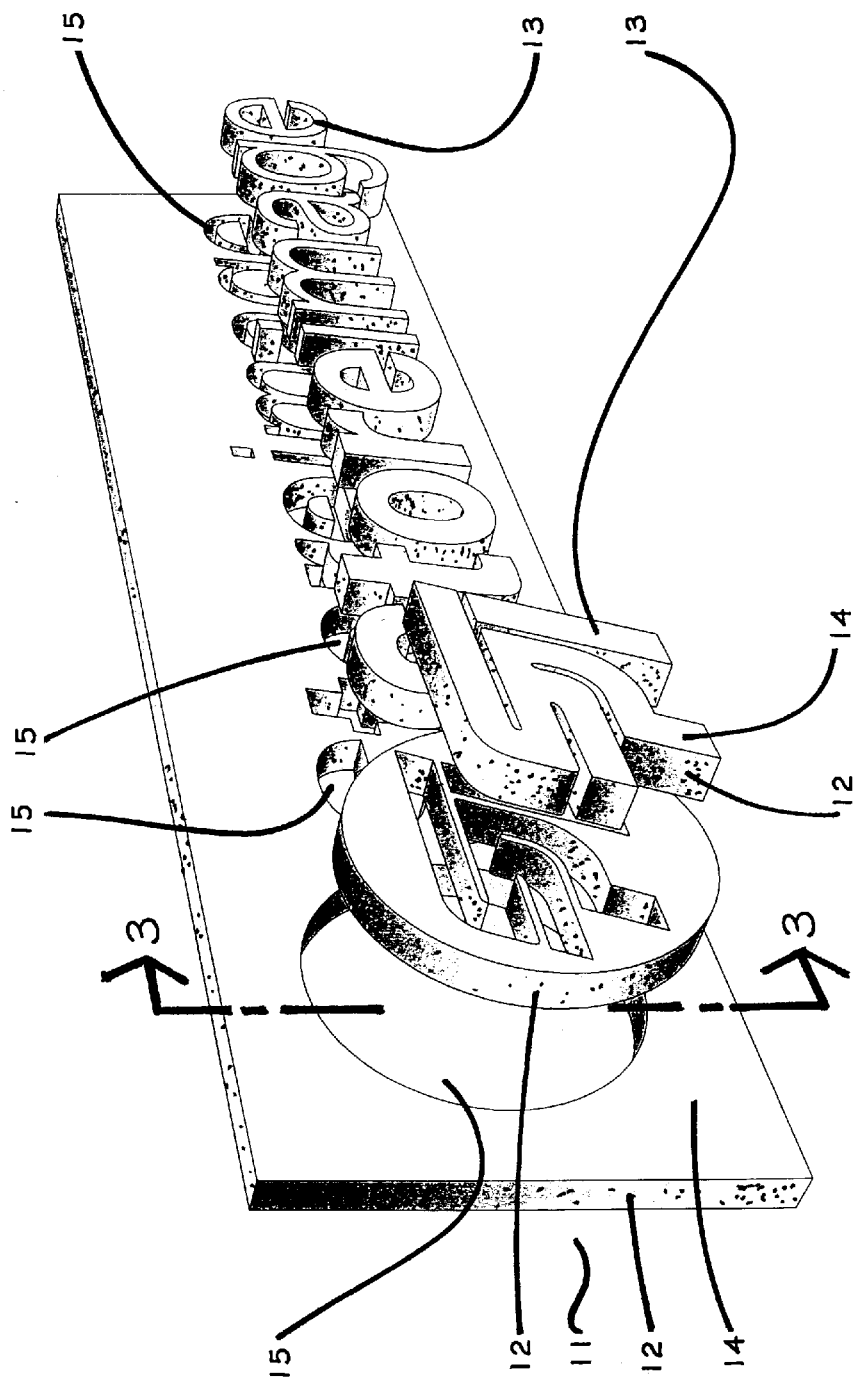
FIG. 2 is an exploded view of the embodiment of FIG. 1.
Figure 3:
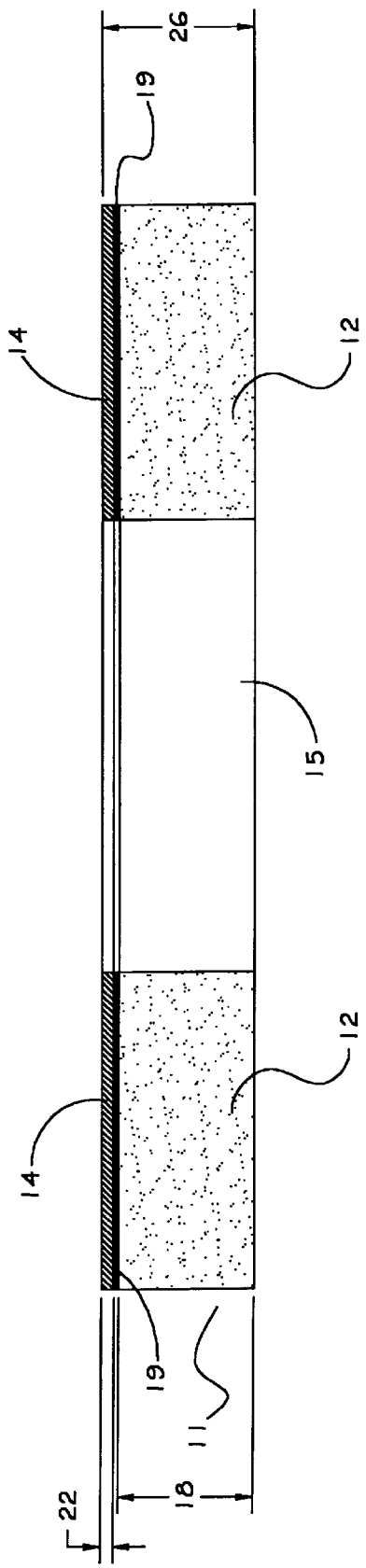
FIG. 3 is a sectional view, taken along lines 3—3 of FIG. 2, of the substrate of the embodiment of FIG. 1.

FIG. 3 is a sectional view of the assembly of FIG. 2, taken along lines 3—3. Referring to FIG. 3, it will be seen that the foam substrate material 12 generally has a width 18 of from about 0.5 to about 3.0 inches and, more preferably, from about 1 to about 2 inches. In one preferred embodiment, width 18 is from about 1.4 to about 1.6 inches.

The foam substrate material 12 has a density of from about 1.2 to about 2.0 pounds per cubic foot and, more preferably, 1.3 to about 1.8 pounds per cubic foot. In one preferred embodiment, the foam substrate material 12 has a density of from about 1.4 to about 1.6 pounds per cubic foot.

In one embodiment, the preferred foam, when evaluated in accordance with the procedure set forth in A.S.T.M. Standard Test D-3574-91 (1991), has an indentation force rating of from about 25 to about 50 pounds force per 50 square inches, a modulus of at least 1.8, a tensile strength of at least about 12 pounds per square inch, a tear resistance of at least about 1.7 pounds per inch thickness, an elongation of at least about 150 percent, a compression set (per cent loss) of less than 10 percent, and a resilience of at least about 40.

In one preferred embodiment, foam substrate material 12 consists essentially of polyurethane foam. Thus, by way of illustration and not limitation, in this embodiment one may use one or more of the polyurethane foams sold by Valle Foam Industries Inc. of 4 West Drive, Brampton, Ontario as foam grades "1335 RBR," "1445," "1540 RBR," and/or "1338."

Referring again to FIG. 3, it will be seen that an adhesive 19 joins foam layer 12 with plastic sheet 14. Any conventional adhesive and/or adhesive joining means may be used to so join these structures which does not degrade the surface of the foam. Thus, by way of illustration, one may use an adhesive marketed by Adchem Adhesives Inc. of 30 Cowansview Road, Cambridge, Ontario as "ADBOND 8706." This adhesive is a spray grade, non-flammable, fast drying adhesive based upon a synthetic resin/rubber combination, and it is suitable for bonding polyurethane foam materials. It has a viscosity of from about 280 to about 320 centipoise, a solids content of from about 28 to about 30 weight percent, and a specific gravity of from about 1.23 to about 1.27.

By way of further illustration, another suitable adhesive is "PERMAGRIP 107," which is sold by Imperial Adhesives, Inc. of 6315 Wiehe Road, Cincinnati, Ohio. This adhesive is comprised of from about 40 to about 50 weight percent of methylene chloride and from about 30 to about 40 weight percent of liquefied petroleum gas propellant.

It is preferred, when adhering the plastic sheet 14 to the foam substrate 12, to apply (as by spraying) the adhesive to the surfaces of both the plastic sheet and the foam substrate.

The plastic sheet 14 may comprise only one sheet of material. Alternatively, plastic sheet 14 may comprise two or more sheets of material joined together. In either event, the thickness 22 of plastic sheet 18 is generally within the range of from about 0.007 to about 0.03 inches and, more preferably, is from about 0.015 to about 0.025 inches. In general, the ratio of the thickness 18 of the foam substrate 12 to the thickness 22 of the plastic layer 14 is at least 15/1 and, preferably, at least 20/1. In many embodiments, the ratio of the thickness 18 to the thickness 22 is at least about 25/1.

It is preferred that plastic sheet 14 consist essentially of a material selected from the group consisting of acrylonitrile-butadiene-styrene (ABS), polyvinyl chloride, and polystyrene.

In one embodiment, plastic sheet 14 is a sheet of high impact polystyrene with a specific gravity of 1.054 to 1.070, a tensile strength of from about 4,000 to about 10,000 pounds per square inch, and a compressive strength of from about 12,000 to about 17,000 pounds per square inch.

In one embodiment, plastic sheet 14 is a "silkscreen grade sheet" of polystyrene sold as "Prime Impax 650" by the Primex Plastics Corproration of 1235 North F Street, Richmond, Ind. This material preferably comes in rectangular sheets which are about 40"×72" and have thicknesses preferably ranging from 0.010 to about 0.125 inches. It is preferred that the thickness 28 of plastic sheet 14 be from about 0.15 to about 0.040 inches.

The plastic sheet 14 preferably is printable. Thus, by way of illustration, one may use one or more of the printable plastic sheets described in U.S. Pat. Nos. 5,891,552 (printable labels), 5,842,722 (printable coplanar laminate), 5,776,604, 5,478,629 (printable sheet made from a copolymer of vinyl chloride and vinyl ester), and the like. The disclosure of each of these United States patents is hereby incorporated by reference into this specification.

In one embodiment, plastic sheet 14 is comprised of a 0.01 clear rigid vinyl substrate bonded to a 0.002 inch brushed silver polyester.

Figure 4:
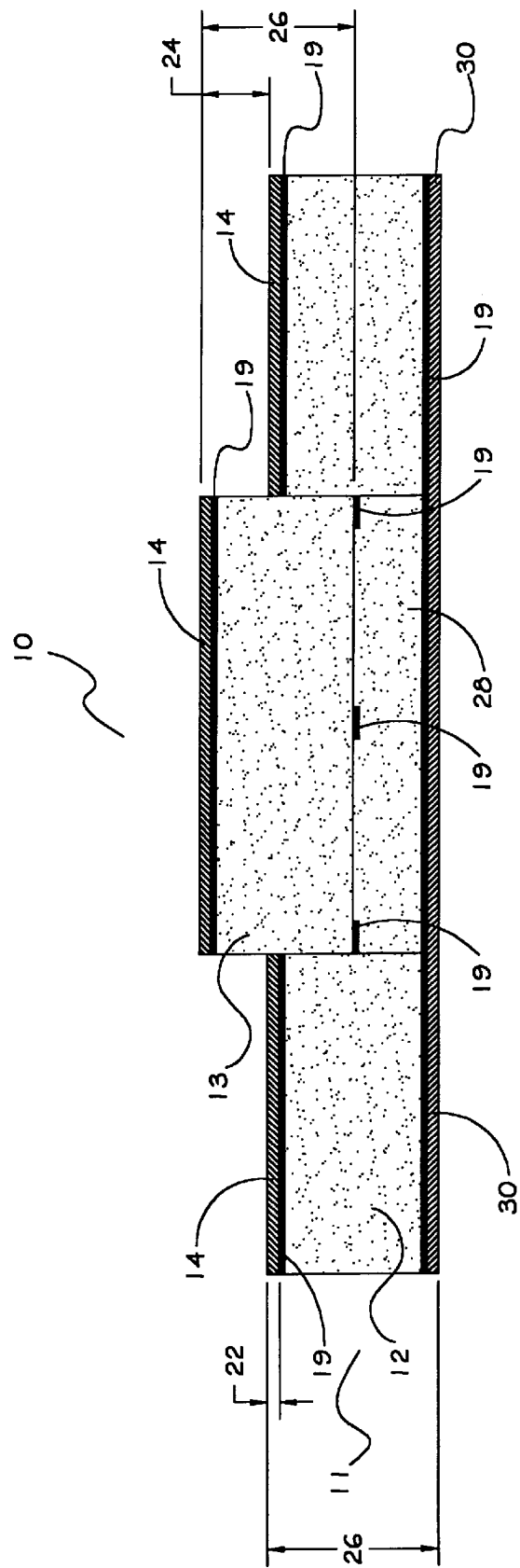
FIG. 4 is a side view of one aspect of the embodiment of FIG. 1.

FIG. 4 is a sectional view of a foam sign assembly 10 in which the cut out 13 is disposed within and above the base 11. In the preferred embodiment depicted, the distance 24 by which cut out 13 extends above base 11, is from about 10 to about 90 percent of the thickness 26 of the cut out 13, provided that cut out 13 is disposed to a depth of at least about 0.2 inches within base 11. It is even more preferred that the distance 24 be at least about 0.5 inches and generally is from about 0.5 to about 1.2 inches.

Referring again to FIG. 4, and in the preferred embodiment depicted therein, it will be seen that a spacer 28 is disposed within base 11 and is contiguous with cut out 13; in another embodiment, not shown, the spacer 28 is not contiguous with the cut out 13. The function of spacer 28 is to afford some structural integrity to the cut out 13/base 11 structure and to help maintain the distance constant. The spacer 28 may be made of many different materials. Because of cost and weight considerations, it is preferred that spacer 28 consist essentially of foam such as, e.g., the same foam used in substrate 12.

The cut out 13 and/or the spacer 28 may be removably attached within base 11. Alternatively, with the use of an adhesive (such as, e.g., adhesive 19), one may permanently attach one or both of such structures to base 11.

Referring again to FIG. 4, and in the preferred embodiment depicted therein, it will be seen that a backing 30 is attached to the base 11 and the spacer 28 by adhesive means 19.

Figure 5:
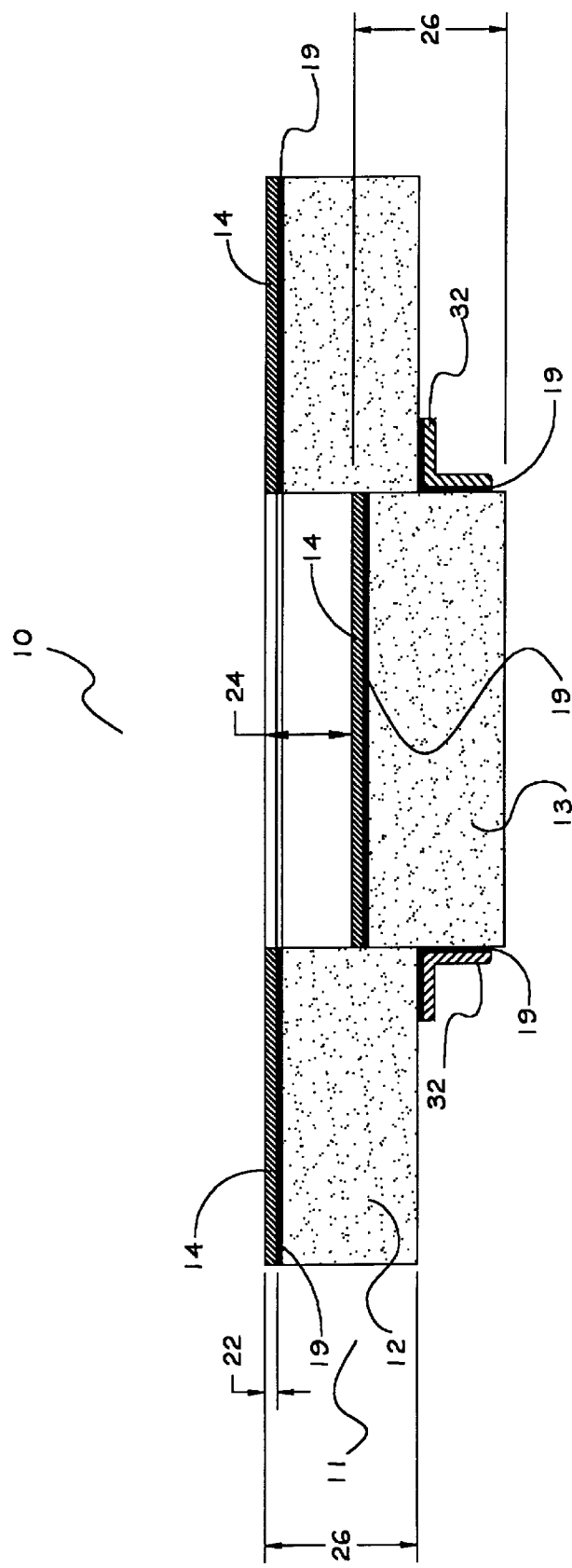
FIG. 5 is a side view of another embodiment of the invention.

FIG. 5 illustrates an assembly 10 which is similar to that depicted in FIG. 4 but differs therefrom in having the cut out 13 disposed below the top surface of base 11 (rather than above it), but not using a spacer 28, and by not using a backing 30. In the embodiment depicted in FIG. 5, plastic angle fasteners 32 are adhesively affixed to base 11 and cut out 13.

Figure 6:
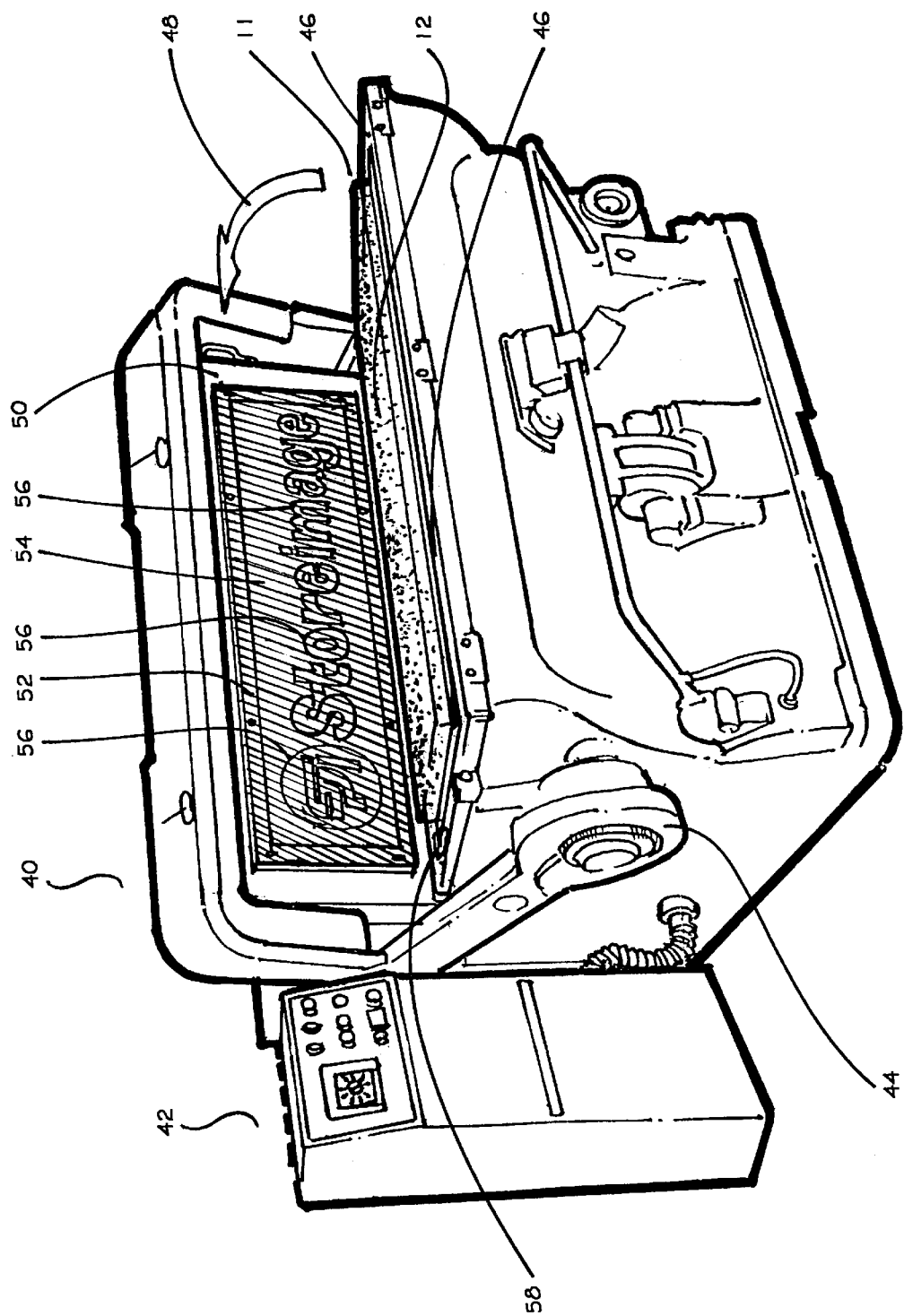
FIG. 6 is a perspective view of a die cutting machine which may be used to prepare the foam sign of the invention.

FIG. 6 is a perspective view of a die cutting machine 40 which may be used in the process of this invention. One preferred die cutting machine 40 is the "TITAN EM" machine manufactured by Erba & Co., 21052 Busto Arsizo, Italy.

Referring to FIG. 6, it will be seen that die cutting machine 40 is comprised of a controller 42 which is operatively connected to a hydraulic assembly 44. The hydraulic assembly 44 causes lower platen 46 to move in the direction of arrow 48 towards upper platen 50.

A steel ruled die 52 is bolted to upper platen 50. In the embodiment depicted, the die 52 is designed to cut out the word "Storeimage" from the base 11. It is essential that, during this process, that the die 52 initially contact the foam material 12 instead of the plastic material 14. If the die 52 initially contacts the plastic material 14, it will fracture the base 11 and produce cut outs 13 with unacceptable properties and appearances.

Applicants do not definitively know why the die cutting process works well when it first contacts the foam material 12 but does not work nearly as well when it first contacts the plastic material 14. It is noteworthy that, in the process of U.S. Pat. No. 2,988,835, the die first contacts kraft paper 17 before it contacts the foam material.

Referring again to FIG. 6, it should be noted that rubber backing 54 is preferably disposed on every portion of the face of die 52 which is not occupied by steel rules 56. In one embodiment, steel rules 56 are made from hardened steel, have a depth of 0.937 inches, and have a beveled edge.

The presence of the rubber backing 54 tends to urge the cut base 11 away from the steel rules 56 after such rules have cut base 11.

Figure 7:
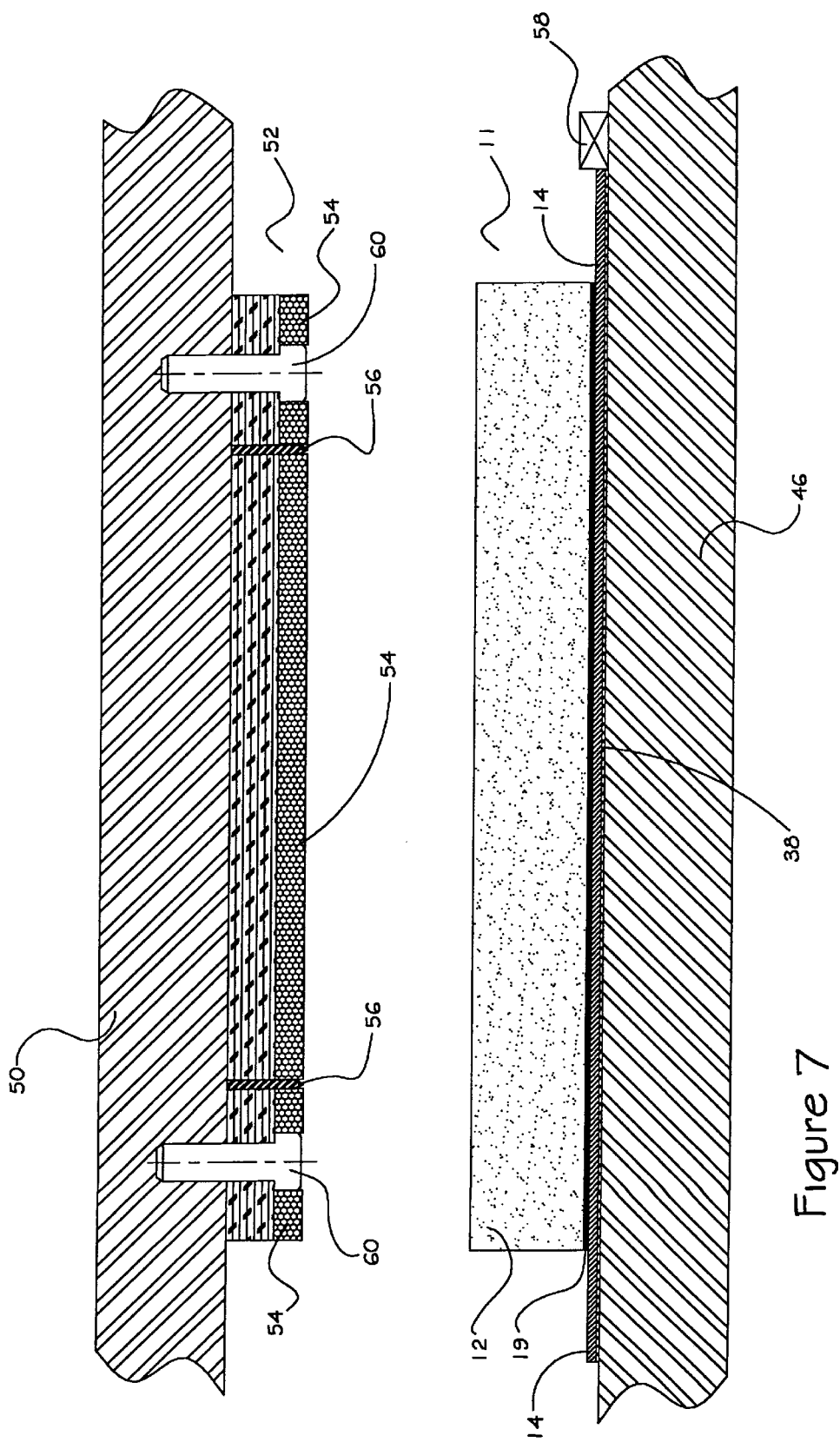
FIG. 7 is a schematic representation of a preferred die cutting process.

FIG. 7 is a schematic representation of a preferred die cutting process.

In the first step of this process depicted in this FIG. 7, a plastic sheet 14 is attached by means of adhesive 19 to foam 12.

In the second step of the process, which step is optional, a printed graphic 38 is printed by conventional means onto the plastic sheet 14. Thus, by way of illustration, one may screen print with solvent-based or water-based ultraviolet inks by conventional means.

Instead of printing a graphic 38 onto the plastic sheet 14, one may apply other decorative effects such as, e.g., enamel water-based paint, metalized films, holographic patterns, another layer of plastic material, etc.

The base 11 produced by the process up to this point consists of a foam material 12 adhesively joined to a plastic material 14 which, in one embodiment, has one or more graphic displays and/or decorative material printed onto or affixed to it. Thereafter, the base 11 is aligned with one or more registration blocks 58, with the foam 12 facing the steel rules 56.

It is preferred not to attach the base 11 to the lower platen 46. By comparison, the steel ruled die 52 is preferably bolted to the upper platen 50 by means of fasteners 60.

In the third step of the process, the cut out 13 and the cut base 11 are removed from the die cutting machine 40.

In the fourth step of the process, the cut out 13 is inserted into cavity 15 so that it is disposed partially but not completely within such cavity (see FIGS. 4 and 5).

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A foam sign comprised of a laminated substrate and a multiplicity of laminated cut outs attached to and disposed within said laminated substrate, wherein:
   (a) said laminated substrate is comprised of a first foam substrate adhesively joined to a first plastic sheet with a top surface, wherein:
      1. said first foam substrate has a thickness of from about 0.5 to about 3.0 inches and a density of from about 1.2 to about 2.0 pounds per cubic foot,
      2. said first plastic sheet has a thickness of from about 0.007 to about to about 0.03 inches,
      3. the ratio of said thickness of said first foam substrate to said thickness of said first plastic sheet is at least about 15/1,
   (b) each of said laminated cut outs is comprised of a second foam substrate adhesively joined to a second plastic sheet with a second top surface, wherein:
      1. the foam in said second foam substrate is identical to the foam in said first foam substrate,
      2. the thickness of said second foam substrate is identical to the thickness of said first foam substrate,
      3. the plastic in said second plastic sheet is identical to the plastic in said first plastic sheet, and
      4. the thickness of said second plastic sheet is identical to the thickness of said first plastic sheet,
   (c) said laminated substrate is comprised of a multiplicity of cavities, and
   (d) each of said laminated cut outs is disposed within one of said cavities such that there is a distance between said first top surface of said first plastic sheet and said second top surface of said second plastic sheet which is from about 10 to about 90 percent of said thickness of said second foam substrate, provided that at least about 0.2 inches of said thickness of said laminated cutout is disposed within said cavity.

2. The foam sign as recited in claim 1, wherein each of said cutouts is snugly disposed within said laminated substrate such that, when a source of light is contacted with one surface of said foam sign, it is not perceived at the opposite surface of said foam sign.

3. The foam sign as recited in claim 1, wherein said first foam substrate consists essentially of polyurethane foam.

4. The foam sign as recited in claim 1, wherein said polyurethane foam has a density of from about 1.3 to about 1.8 pounds per cubic foot.

5. The foam sign as recited in claim 4, wherein said polyurethane foam has an indentation force rating of from about 25 to about 50 pounds per 50 square inches, a modulus of at least about 1.8, a tensile strength of at least about 12 pounds per square inch, a tear resistance of at least about 1.7 pounds per square inch, an elongation of at least about 150 percent, and a compression set of less than 10 percent.

6. The foam sign as recited in claim 4, wherein said plastic sheet is printable.

7. The foam sign as recited in claim 6, wherein said second top surface of said second plastic sheet is disposed above said first top surface of said first plastic sheet.

8. The foam sign as recited in claim 7, wherein a spacer is disposed within said cavity beneath each of said laminated cut outs.

9. The foam sign as recited in claim 8, wherein said spacer is contiguous with said laminated cut out.

10. A process for preparing the foam sign of claim 1, comprising the steps of adhesively joining said first foam substrate to said first plastic sheet to form a laminated substrate with a top plastic face and a bottom foam face, disposing said laminated substrate on a platen of a die cutting machine comprised of a top platen, a bottom platen, and a multiplicity of steel rules connected to said top platen so that said bottom foam face is facing upwardly and said top plastic face is contiguous with said bottom platen, moving said bottom platen to cause said laminated substrate to contact said steel rules such that said steel rules first contact said bottom foam face and thereafter cut through to said top foam face, whereby at least one laminated cut out comprised of a second foam substrate adhesively joined to a second plastic sheet with a second top surface is formed, and wherein:

(a) the foam in said second substrate is identical to the foam in said first substrate, (b) the thickness of said second substrate is identical to the thickness of said first substrate, (c) the plastic in said second plastic sheet is identical to the plastic in said first plastic sheet, and (d) the thickness of said second plastic sheet is identical to to the thickness of said first plastic sheet.

11. The process as recited in claim 10, further comprising the step of disposing each of said laminated cut outs within each of said cavities such that there is a distance between said first top surface of said first plastic sheet and said second top surface of said second plastic sheet which is from about 10 to about 90 percent of said thickness of said second foam substrate.

12. The process as recited in claim 11, wherein at least about 0.2 inches of each of said cut outs is disposed within said cavity.

13. The process as recited in claim 12, wherein said plastic sheet is printable.

14. The process as recited in claim 13, comprising the step of disposing said second top surface of said second plastic sheet above said first top surface of said first plastic sheet.

15. The process as recited in claim 14, comprising the step of disposing a spacer beneath each of said laminated cut outs.

16. The process as recited in claim 15, wherein said spacer is contiguous with said laminated cut out.

* * * * *